J. WOLFLA.
WAGON BRAKE.
No. 110,183. Patented Dec. 13, 1870.
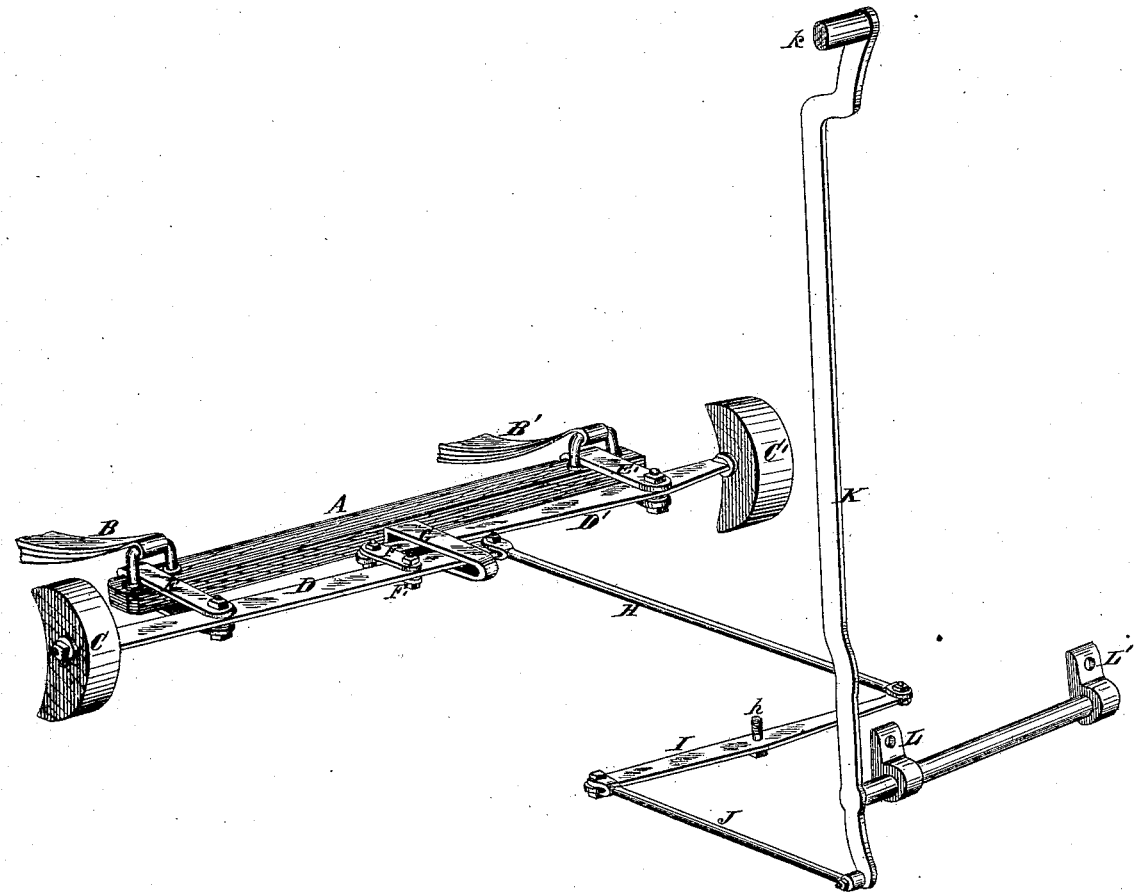

United States Patent Office.

JACOB WÖLFLA, OF CINCINNATI, OHIO, ASSIGNOR TO THE UNION OMNIBUS AND WAGON MANUFACTURING COMPANY, OF SAME PLACE.

Letters Patent No. 110,183, dated December 13, 1870.

IMPROVEMENT IN WAGON-BRAKES.

The Schedule referred to in these Letters Patent and making part of the same.

*To all whom it may concern:*

Be it known that I, JACOB WÖLFLA, of Cincinnati, Hamilton county, State of Ohio, have invented a certain new and useful Improvement in Omnibus and Wagon-Brakes; and I hereby declare the following to be a sufficiently full, clear, and exact description thereof to enable one skilled in the art to which my invention appertains to make and use the same, reference being had to the accompanying drawing making part of this specification.

Nature and Objects of Invention.

My invention consists of a peculiar combination and arrangement of parts, composing a brake for omnibuses, wagons, &c., whereby direct action and equal pressure are brought to bear upon both wheels of the vehicle in a very simple and powerful manner, the object of my invention being a direct application of power, and the avoidance of devices which are submitted to torsion in the action of the brake, which is found to prevent a rapid application of the brakes and equal pressure upon both wheels.

Description of the Accompanying Drawing.

The accompanying drawing is a perspective view of a brake embodying my invention.

General Description.

A is the cross-rail of the running-gear of the hind wheels of the wagon, B B' being the springs of the same.

The rubbers or brake-blocks C C', one to each hind wheel, are secured to the levers D D' in such a manner as to be capable of swiveling upon said levers.

The levers are pivoted to the projecting straps E E', and are linked together at the inner ends for simultaneous action by means of the short straps F F'. The ends of the levers are supported by and slide between the guide G.

The lever D is connected by rod H to the lever I, which is pivoted at $h$ to the bottom of the wagon, the lever I being operated by rod J and foot-lever K, the latter of which is journaled in the bearings L L' attached to the front of the wagon. The foot of the driver is applied to the projection $k$ for the operation of the brake.

It will be seen that by this combination and arrangement of parts the rubbers C C' are applied simultaneously with equal pressure upon both wheels, and that none of the parts are submitted to torsion, as in other brakes. The entire device, moreover, is simple, and not liable to get out of order.

Claim.

The combination and arrangement of the pivoted levers D D' E E', links F F', and rod H, the levers D D' carrying the rubbers C C', and the whole being connected and operated substantially in the manner and for the purpose specified.

In testimony of which invention I hereunto set my hand.

JACOB WÖLFLA.

Witnesses:
HARLAND A. EDWARDS.
E. F. LAYMAN.